(12) United States Patent
Lindström et al.

(10) Patent No.: US 6,461,577 B1
(45) Date of Patent: Oct. 8, 2002

(54) TWO-STAGE BIOLEACHING OF SULPHIDIC MATERIAL CONTAINING ARSENIC

(75) Inventors: Börje Lindström, Umeå; Åke Sandström, Luleå Tekniska Universitet; Jan-Eric Sundkvist, Läkarvägen, all of (SE)

(73) Assignee: Boliden Mineral AB, Boliden (SE)

( * ) Notice: Subject to any disclaimer, the term of this patent is extended or adjusted under 35 U.S.C. 154(b) by 0 days.

(21) Appl. No.: 09/551,575

(22) Filed: Apr. 18, 2000

(30) Foreign Application Priority Data

May 5, 1999 (SE) ................................. 9901613

(51) Int. Cl.$^7$ .................... C22B 11/00; C22B 3/00; C22B 30/00
(52) U.S. Cl. .................. 423/27; 423/29; 423/87; 423/150.1; 423/150.4
(58) Field of Search ................... 423/87, 27, 29, 423/150.1, 150.4, DIG. 17

(56) References Cited

U.S. PATENT DOCUMENTS

| | | | | |
|---|---|---|---|---|
| 4,729,788 A | * | 3/1988 | Hutchins et al. | 423/27 |
| 4,888,293 A | | 12/1989 | Hackl et al. | |
| 5,378,437 A | | 1/1995 | Kleid et al. | |
| 5,397,380 A | | 3/1995 | Petersson et al. | |
| 5,919,674 A | * | 7/1999 | Tunley | 435/168 |
| 6,110,253 A | * | 8/2000 | Kohr et al. | 423/27 |
| 6,207,443 B1 | * | 3/2001 | King | 435/262 |

FOREIGN PATENT DOCUMENTS

WO    WO98/07892    2/1998

OTHER PUBLICATIONS

Åke Sandström et al, "Bioleaching of a complex sulphide ore with moderate thermophilic and extreme thermophilic microorganisms", Hydrometallurgy, vol. 46, pp. 181–190, 1997, no month.

Olli H. Tuovinen et al, "Oxidative Dissolution of Arsenopyrite by Mesophilic and Moderately Thermophilic Acidophiles", Applied and Environmental Microbiology, vol. 60, No. 9, pp. 3268–3274, Sep., 1994.

Database WPI, Section Ch, Week 199016 Derwent Publications Ltd., London, GB; AN 1990–121845 XP002145234 & SU 1 511 287 A (Proteins Biosynth), Sep. 30, 1989 *abstract*.

Database WPI, Section Ch, Week 199826 Derwent Publications Ltd., London, GB; AN 1998–295491 XP002145235 & RU 2 089 637 C (Irgiredmet Stock Co), Sep. 10, 1997 *abstract*.

F. Torres et al, "The Bioleaching of Different Sulfide Concentrates Using Thermophilic Bacteria", Metallurgical and Materials Transactions B: Process Metallurgy & Materials Processing Science, US, The Materials Information Society, Vo. 26–B, No. 3, pp. 455–465, Jun. 1, 1995.

* cited by examiner

*Primary Examiner*—Steven Bos
(74) *Attorney, Agent, or Firm*—Burns Doane Swecker & Mathis LLP

(57) ABSTRACT

A method of leaching sulphidic material that contains metals and arsenic under oxidising conditions and with the aid of microorganisms is characterised by mixing the material with an acid aqueous solution to form a pulp, and in that the material is leached in a first leaching stage at a pH of below 2 and at a temperature that ranges from room temperature to about 55° C. in the presence of an active quantity of microorganisms of the mesophilic and/or moderately thermophilic type, wherewith the major part of the arsenic content of the material and possibly also part of its metal content is/are leached-out and the arsenic leached from said material is oxidised successively to a pentavalent state. The remaining leachable metal content of the material is leached-out in a following leaching stage in the presence of an active quantity of an extremely thermophilic micro-organism and at a temperature within the active range of said micro-organism, said temperature being higher than the temperature in the first stage. The pH is suitably raised in the second stage to a level at which the pentavalent arsenic present in solution is caused to transform to a solid state and precipitate-out as a metal-containing arsenate which is separate from the leaching solution together with unleached material in the pulp after termination of the leaching process.

22 Claims, 1 Drawing Sheet

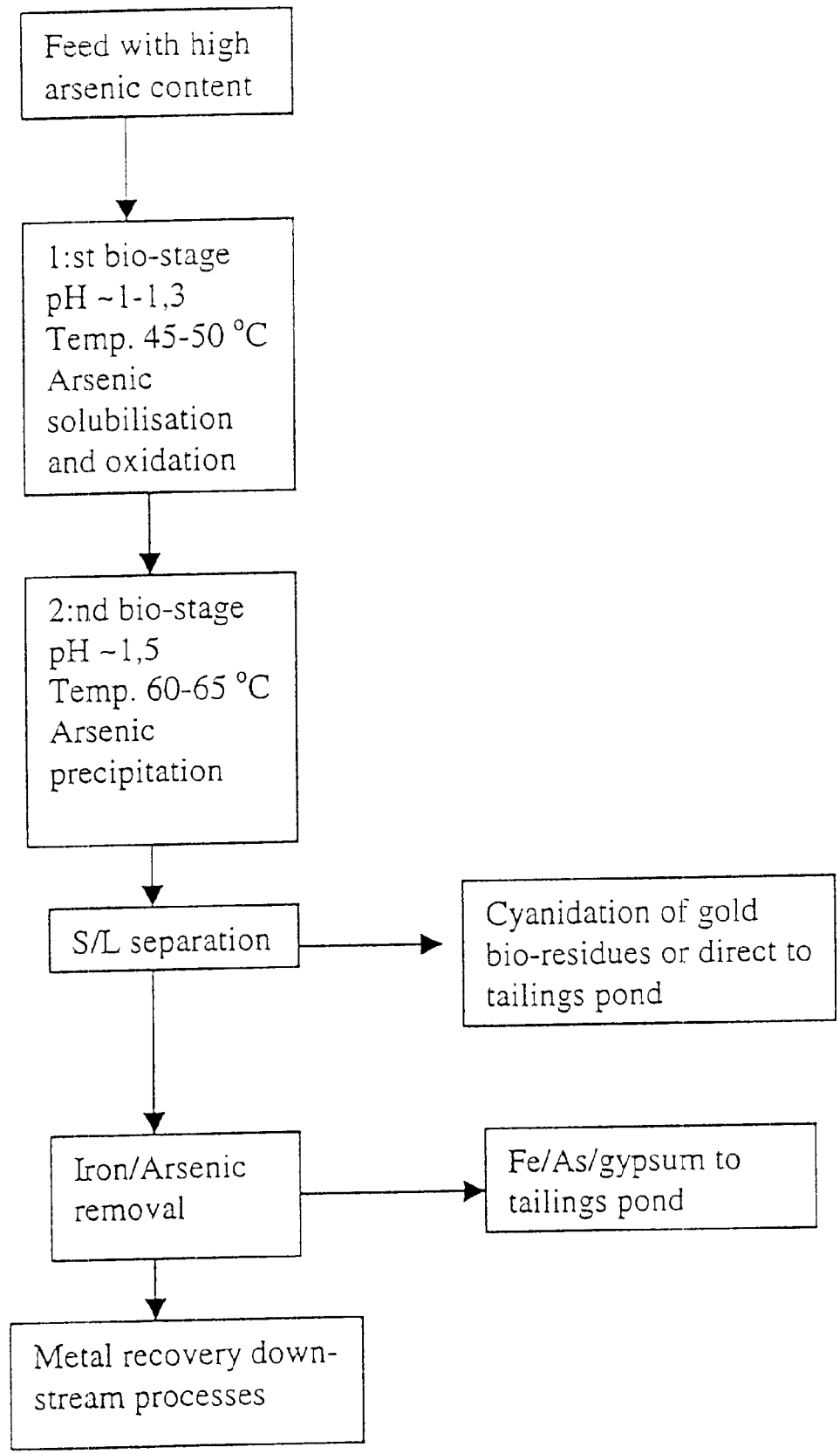

TWO-STAGE BIOLEACHING OF SULPHIDIC MATERIAL CONTAINING ARSENIC

The present invention relates to a method of leaching sulphidic material that contains metals and arsenic under oxidising conditions and with the aid of microorganisms.

BACKGROUND OF THE INVENTION

1. Field of the Invention

It has long been known to leach sulphidic material, such as ores and ore concentrates, in the presence of microorganisms in the form of different types of bacteria capable of favouring oxidation of both sulphur and iron and other metals in the materials, with the object of winning the valuable metal content of the materials. This type of leaching is also called bioleaching.

For instance, valuable metals can be leached out and brought into solution which is then treated for selective winning of valuable metals, such as copper, nickel, cobalt, uranium and zinc. The noble or precious metal content that cannot be recovered directly by leaching in this way, for instance the precious metal or noble metal content of refractory materials such as iron pyrite and arsenopyrite, can be recovered by first dissolving surrounding metal sulphides so as to free the precious or noble metals, and thereafter treating the bioleaching residue hydrometallurgically in a conventional manner to leach out the precious or noble metals, for instance by treating with cyanide.

Bioleaching processes afford certain advantages over other possible hydrometallurgical processes for working-up metal sulphide material, for instance pressure leaching, by virtue of the fact that bacteria favour oxidation of both sulphidic sulphur and elementary sulphur to form a sulphate. Oxidation of Fe(II) to Fe(III) as well as As(III) to As(V) is also favoured. The bacteria leached material can thus be further leached in subsequent stages, for instance in a precious metal recovery process, without risk of problems caused by the presence of elementary sulphur. However, one serious drawback with bioleaching is that very long leaching times are required at room temperature in order to achieve sufficiently high metal yields. Consequently, it is necessary to work at elevated temperatures and therewith accelerate the leaching process so that leaching can be effected within time periods of reasonable duration.

Bioleaching of different types of sulphidic material with the aid of various types of microorganisms is described in our earlier publication U.S. Pat. No. 5,397,380, while the basic background art in this field may be found in AU-A-11201/92, CA-A-1 023 947 and U.S. Pat. No. 4,571,387, for instance.

In order to accelerate the leaching process and therewith enhance the efficiency of the metal winning process over reasonable leaching times, it is thus necessary to leach at elevated temperatures with the aid of special thermotolerant (thermophile) bacteria cultures, such as those proposed in WO 92/16669 which describes leaching of refractory sulphidic material.

With respect to their ability to resist elevated temperatures, the bacteria cultures concerned can be divided into three groups, namely mesophilic bacteria, e.g. Thiobacillus ferrooxidans, which have a use range of up to 40° C. at most, moderate thermophilic bacterial (thermotolerant) that have a use range of up to about 50–55° C., and extremely thermophilic bacteria of which some can be used up to a temperature of about 90° C., although the majority can only be used effectively at temperatures of 65–70° C.

Several investigations in which thermotolerant cultures have been used to bioleach different sulphide materials have been presented in the scientific literature in recent times. For example, E. B. Lindström et al: J. Ind Microbiol. (1990) 5: 375–382, describe relating to the leaching of arsenopyrite with the aid of extreme thermophilic Sulfolobus cultures, O. H. Tuovinen et al: Appl. Environ. Microbiol. (1994) 60: 3268–3274, describe experiments relating to the leaching of arsenopyrite with mesophilic and moderate thermotolerant bacteria, Å. Sandström et al: Hydrometallurgy (1997) 46: 181–190, which discuss bioleaching of sulphide ores with the same type of bacteria as the earlier reference, and K. B. Hallberg et al: Appl. Microbiol. Biotechnol. (1996) 45: 212–216, which discuss the toxicity of arsenic in respect of high temperature bioleaching of gold-containing arsenopyrite.

During experiments carried out with the use of extremely thermophilic micro-organisms, for instance of the Sulfolobus metallicus type, it has been established, in several of the aforementioned papers among others, that the possibility of employing bioleaching at elevated temperatures is restricted by the presence of arsenic in the material, since arsenic tends to have a toxic effect on the extremely thermophilic bacteria cultures, although not to the same high extent on the mesophilic and moderate thermophilic cultures, and that this toxicity increases with higher arsenic concentrations in the material. In this respect, As(III) is particularly toxic and, unfortunately, even As(V) exhibits a toxicity which prevents it from being tolerated in large amounts. This toxicity is manifested by the inability of the bacteria to reproduce during the leaching process, which it would otherwise do under conditions favourable to reproduction, and is therefore never effective. Consequently, in order to make such bioleaching of arsenic containing material possible, it is necessary to heavily dilute the pulp concentration, which can also be expressed as pulp density, i.e. the ratio of material quantity to leaching solution volume must be kept low so as to fall beneath the toxic limit of the culture concerned with respect to arsenic. It will be understood that this problem has, unfortunately, a highly negative effect on the economy of the bioleaching process with respect to working-up arsenic containing materials.

An object of the present invention is to eliminate the problems that the toxicity of arsenic creates with respect to extremely thermophilic bacterial cultures, so that an economically attractive process can be provided for bioleaching arsenic-containing sulphidic ores and concentrates of such ores.

This object is achieved by the present invention, which comprises the features and stages specified in the accompanying Claims.

BRIEF DESCRIPTION OF THE DRAWING

The drawing is a flowchart illustrating one embodiment of the invention.

DETAILED DESCRIPTION OF THE INVENTION

According to the invention, the material is first mixed with an acid aqueous solution to form a pulp, and the major part of the arsenic contained in the material is leached-out in a first leaching stage, possibly together with a part of the metal content of said material. Leaching is carried out under oxidative conditions at a pulp pH of below 2, in the presence of active quantities of microorganisms of the mesophilic and/or moderate thermophilic type and at a temperature that ranges from room temperature to 60° C. The arsenic leached from the material is therewith oxidised successively from a trivalent to a pentavalent state. During this first stage, the toxicity of the pulp will thus decrease successively at the rate at which the As(III)/As(V) ratio decreases with the increasing degree of oxidation of the pulp.

The remaining leachable metal content of the material is leached therefrom in a following leaching stage, under conditions that are favourable to the growth of extremely thermophilic bacteria cultures, said leaching process thus being effected in the presence of an active quantity of an extremely thermophilic micro-organism, preferably of the Sulfolobus metallicus type, after raising the temperature to a level within the active range of the thermophilic microorganism.

As a result of raising the temperature in the second stage, As(V) will tend to precipitate out progressively in the form of different metal arsenates, for instance iron arsenates. The equilibrium that determines the residual content of As(III) in the solution will therewith be displaced to the right, i.e. in a direction towards the As(V), and the highly toxic As(III) content will decrease still further in keeping with the amount of arsenate that precipitates out, resulting in a significant reduction in the total toxicity of the pulp.

In comparison with a corresponding single stage process, the two-stage process according to the invention enables a higher pulp density, in practice a much higher pulp density, to be used from the very beginning of the process.

The present invention is based, among other things, on the understanding that the extremely thermophilic microorganisms will survive the presence of mesophilic and moderate thermophilic microorganisms and hence can already be present, although inactive, in the first leaching stage and then caused to reproduce into an effective population during the second stage, in which conditions favourable to such growth are selected.

The toxicity of the pulp can be further reduced in the second leaching stage, by appropriately raising the pH of the pulp to a level at which the earlier formed pentavalent arsenic present in solution is caused to transform to a solid state and precipitate out as a metallic arsenate, which is separated from the leaching solution together with unleached material upon completion of the leaching process.

Elevation of the pH in the second leaching stage in addition to the aforesaid temperature increase, for instance a raise to pH>1.5, accelerates the precipitation of arsenates and consequently the equilibrium As(III)eAs(V) will be displaced more to the right, so as to obtain a total arsenic content that can be tolerated by the extremely thermophilic culture in the second leaching stage.

The first stage is preferably carried out at a temperature of 45–55° C. and at a pH of 1.0–1.3, these ranges enabling an optimal arsenic leaching and oxidation rate to be maintained.

The second stage of the leaching process is preferably carried out at a temperature of 65–70° C. and at a pH of 1.5–2.0, therewith maintaining the highest possible rate of oxidation of other sulphide mineral in the material.

The duration of the first stage is suitably chosen so that there will be obtained in the first stage an arsenic concentration that is non-toxic to the extremely thermophilic microorganism chosen.

The volume of leaching solution is suitably adapted in the process so as to result in a pulp density within the range of 10 to 25%.

When bioleaching refractory gold-containing arsenic-sulphur pyrites or concentrates of such ores, the separated leaching residue may be conveniently treated with cyanide in a subsequent stage to recover gold and other precious metals therefrom, without deleterious effect to any elementary sulphur present.

The invention will now be further described with reference to a flowchart that illustrates an example of a suitable process and an exemplifying embodiment.

The flowchart illustrates bioleaching of materials that have a high arsenic content, which includes different sulphide ores or concentrates of such ores that have winnable metal values either in the form of sulphides in a simple and/or complex form or precious metals in refractory ores, i.e. ores that are considered difficult to work-up with the intention of winning their valuable metal content, such as arsenopyrite (FeAsS) or pyrrhotite ($Fe_{n-1}S$).

In the first bioleaching stage, the material is leached at a temperature of 45–50° C. in the presence of active quantities of mesophilic or moderate thermophilic bacteria with an acid aqueous solution, for instance diluted sulphuric acid, to form a pulp having a pH of 1.1–1.3. During the leaching process, primarily arsenic is dissolved out from its sulphide mineral to form trivalent arsenic in solution, and is successively oxidised, by atmospheric oxygen supplied to the pulp, in coaction with the bacteria present in said pulp to pentavalent arsenic which begins to precipitate out in the form of different metal arsenates. Leaching of the material in the first stage is continued whilst the arsenic content of the pulp is higher than the value at which the arsenic is toxic to the extremely thermophilic bacteria that are already present in the first stage although in an inactive state but which can reproduce to active quantities in the second leaching stage provided that the arsenic content in this stage is non-toxic. Sampling is carried out continuously, to determine an appropriate time at which the second leaching stage can be commenced.

The extremely thermophilic bacteria culture in the pulp is activated and caused to reproduce, by raising the temperature to 60–65° C. and raising the pH to about 1.5 at the same time, therewith successively growing a bacterial culture population that is active in respect of the process. Other leachable metals present in the pulp are leached-out in this leaching stage, at the same time as oxidation of As(III) to As(V) continues and therewith causes the arsenic to precipitate out primarily as not-readily dissolved arsenates, such as iron arsenate and complex arsenate/iron compounds. Because the concentration of trivalent arsenic will quickly fall as a result of this process, the toxic effect of the pulp on the extremely thermophilic bacteria will also fall at the same rate.

Upon completion of the second leaching stage, the pulp is separated into leaching residues and leaching solution, wherewith the leaching residues can be dumped when essentially all of its valuable metal content has been leached-out. With respect to refractory minerals that contain a precious metal, this metal can be won in a following cyanide leaching stage.

The leaching solution is then cleansed of its remaining arsenic content by adding lime, therewith enabling the resultant gypsum precipitate that contains arsenic and any iron present to be dumped. The valuable metal content of the thus purified metal containing leaching solution can then be worked-up in some suitable manner depending on its composition, for instance by electrolysis or selective precipitation.

EXAMPLE

A flotation concentrate originating from Petiknäs and containing arsenopyrite was leached in a first leaching series. Bioleaching was effected in a leaching vessel A with a moderate thermophilic culture at 45° C., while bioleaching was effected in a leaching vessel B with a Sulfolobus culture at 65° C.

The concentrate had the following composition (w-%).

| Cu | Zn | Pb | S | As | Fe |
| --- | --- | --- | --- | --- | --- |
| 0.6 | 2.8 | 0.6 | 34.7 | 12.1 | 36.2 |

The bioleaching process was started batch-wise in the two vessels, with a pulp consistency or density of 4% (w/v). Continuous operation was started after 13 calendar days, wherewith material was pumped from vessel B to a collecting vessel C, whereafter the same volume was pumped from vessel A to vessel B, and finally fresh mineral suspension was pumped from a mineral tank M to the leaching vessel A. The pumping rate was adapted to $D=50\ h^{-1}$ at a pulp density of 12% solids in the first phase, and to a pulp density of 15% in the second phase. Samples were taken one or two times per calendar day, for analysis of Fe(tot), Fe(sup), (i.e. Fe in solution), As(tot), As(sup) Fe(II), pH and redox.

The tests were continued for a total of 45 calendar days. The test results could be interpreted and summed-up as showing that the Sulfolobus culture survived the presence of the moderate thermophilic culture. The arsenic content of the concentrate leached-out quantitatively already at 45° C. The arsenic-content was reduced to a level which was non-toxic to the Sulfolobus culture, as a result of arsenate precipitation achieved by adjusting the pH in the second stage, therewith increasing the leaching yield with respect to remaining metals. The results indicate that the pulp density could possibly be further increased and that the duration of the stage could be reduced while still achieving acceptable yields.

In summary, the inventive bioleaching process affords the following advantages over a one-stage bioleaching process with mesophilic and moderate thermophilic cultures.

A higher "total" biooxidation rate in respect of arsenic-containing material.

A higher metal yield by virtue of achieving more complete oxidation at higher temperatures. For instance, because a certain amount of refractory (not readily recovered) gold is present in iron pyrite.

Arsenic-containing material requiring high temperatures can be treated, for instance chalcopyrite concentrate that contains arsenic.

An interesting point from an environmental aspect is that arsenic tends to precipitate-out in a more stable form at high temperatures.

Less indirect water cooling requirements (lower water consumption), and less need for heat exchanging surfaces.

Higher exiting cooling water temperatures, i.e. 60–65° C. as compared with 40–45° C., enables the heat generated to be used more effectively in heating rooms and other spaces, etc.

The cyanide consumed in winning gold from the bioleaching residue will probably lower the dependency on more complete oxidation of sulphur to sulphate.

What is claimed is:

1. A process for leaching sulphidic material containing metals and arsenic under oxidizing conditions and with the aid of microorganisms, comprising the steps of:
   a) mixing the material with an acid aqueous solution to obtain a pulp;
   b) leaching the pulp by conducting a leaching process in a first leaching stage at a pH below 2 and at a temperature ranging from room temperature to a temperature of about 55° C. in the presence of an active quantity of microorganisms that are mesophilic and/or moderate thermophilic, wherewith a major part of the arsenic contained in the material is leached-out and oxidized successively to a pentavalent state;
   c) raising the temperature of the pulp to 60–65° C., wherewith an extremely thermophilic microorganism culture present in the pulp is activated and caused to reproduce to form an active quantity; and
   d) leaching in a second leaching stage the remaining leachable metal content in the material of the pulp in the presence of an active quantity of said extremely thermophilic microorganism under conditions that are favorable to the growth of said extremely thermophilic microorganism.

2. The process of claim 1, wherein the pH in the second leaching stage is raised to a level at which pentavalent arsenic present in solution is transformed to a solid state and precipitated as metal-containing arsenate, which is separated from the leaching solution together with non-leached material in the pulp subsequent to termination of the second leaching stage.

3. The process of claim 2, wherein a part of the metal content is leached out in the first leaching stage.

4. The process of claim 3, wherein the first leaching stage is carried out at a temperature of 45–55° C. and at a pH of 1.0–1.3.

5. The process of claim 4, wherein the second leaching stage is carried out at a temperature of 65–70° C. and at a pH of 1.5–2.0.

6. The process of claim 5, wherein Sulfolobus metallicus is the extremely thermophilic microorganism.

7. The process of claim 6, wherein the first leaching stage is continued over a period of time such that the arsenic concentration of the pulp will not be toxic to the extremely thermophilic microorganism.

8. The process of claim 7, wherein the volume of acid aqueous solution is adapted to provide a pulp density of from 10 to 25%.

9. The process of claim 7, wherein the sulphidic material containing metals and arsenic is gold-containing arsenic-iron pyrite ores or concentrates of such ores and the process further comprises the step of treating separated residue in a subsequent stage to recover gold and other precious metals therefrom.

10. The process of claim 1, wherein a part of the metal content is leached out in the first leaching stage.

11. The process of claim 1, wherein the first leaching stage is carried out at a temperature of 45–55° C. and at a pH of 1.0–1.3.

12. The process of claim 2, wherein the first leaching stage is carried out at a temperature of 45–55° C. and at a pH of 1.0–1.3.

13. The process of claim 2, wherein the second leaching stage is carried out at a temperature of 65–70° C. and at a pH of 1.5–2.0.

14. The process of claim 1, wherein the second leaching stage is carried out at a temperature of 65–70° C. and at a pH of 1.5–2.0.

15. The process of claim 2, wherein Sulfolobus metallicus is the extremely thermophilic microorganism.

16. The process of claim 1, wherein Sulfolobus metallicus is the extremely thermophilic microorganism.

17. The process of claim 2, wherein the first leaching stage is continued over a period of time such that the arsenic concentration of the pulp will not be toxic to the extremely thermophilic microorganism.

18. The process of claim 1, wherein the first leaching stage is continued over a period of time such that the arsenic concentration of the pulp will not be toxic to the extremely thermophilic microorganism.

19. The process of claim 2, wherein the volume of acid aqueous solution is adapted to provide a pulp density of from 10 to 25%.

20. The process of claim 1, wherein the volume of acid aqueous solution is adapted to provide a pulp density of from 10 to 25%.

21. The process of claim 3, wherein the sulphidic material containing metals and arsenic is gold-containing arsenic-iron pyrite ores or concentrates of such ores and the process further comprises the step of treating separated residue in a subsequent stage to recover gold and other precious metals therefrom.

22. The process of claim 1, wherein the sulphidic material containing metals and arsenic is gold-containing arsenic-iron pyrite ores or concentrates of such ores and the process further comprises the step of treating separated residue in a subsequent stage to recover gold and other precious metals therefrom.

* * * * *